(12) United States Patent
Salter et al.

(10) Patent No.: US 9,714,749 B1
(45) Date of Patent: Jul. 25, 2017

(54) ILLUMINATED VEHICLE GRILLE ASSEMBLY

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/150,701

(22) Filed: May 10, 2016

(51) Int. Cl.
| | |
|---|---|
| *F21V 9/00* | (2015.01) |
| *F21S 8/10* | (2006.01) |
| *B60Q 1/28* | (2006.01) |
| *B60Q 1/00* | (2006.01) |
| *B62D 25/08* | (2006.01) |
| *F21Y 101/00* | (2016.01) |

(52) U.S. Cl.
CPC ........ *F21S 48/2231* (2013.01); *B60Q 1/0011* (2013.01); *B60Q 1/28* (2013.01); *B62D 25/085* (2013.01); *F21S 48/215* (2013.01); *F21S 48/2268* (2013.01); *F21S 48/25* (2013.01); *B60Q 2400/20* (2013.01); *F21Y 2101/00* (2013.01)

(58) Field of Classification Search
CPC ...... B60D 25/085; B60Q 1/0011; B60Q 1/28; F21S 48/215; F21S 48/2231; F21S 48/2237; F21S 48/2243; F21S 48/225; F21S 48/2268; F21S 48/25

USPC .......................................... 362/496, 509–511
See application file for complete search history.

(56) References Cited

U.S. PATENT DOCUMENTS

| | | |
|---|---|---|
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |

(Continued)

FOREIGN PATENT DOCUMENTS

| | | |
|---|---|---|
| CN | 1453600 A | 11/2003 |
| CN | 101337492 A | 1/2009 |

(Continued)

*Primary Examiner* — Jason Moon Han
(74) *Attorney, Agent, or Firm* — Jason Rogers; Price Heneveld LLP

(57) ABSTRACT

A vehicle grille assembly is provided herein and includes a light-transmissive grille. At least one light guide is contained within the grille and a light source is configured to supply light to the at least one light guide to illuminate the grille.

20 Claims, 5 Drawing Sheets

(56) References Cited

U.S. PATENT DOCUMENTS

| | | | |
|---|---|---|---|
| 7,147,355 B1 * | 12/2006 | Kiler | B60Q 1/2661 362/496 |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,469,569 B1 | 6/2013 | Tunnicliffe et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,093,003 B2 | 7/2015 | Logunov et al. | |
| 9,187,034 B2 | 11/2015 | Tarahomi et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0232174 A1 * | 9/2010 | Arakawa | B60Q 1/2661 362/547 |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0272017 A1 | 10/2013 | Weaver | |
| 2013/0335994 A1 | 12/2013 | Mulder et al. | |
| 2013/0335997 A1 | 12/2013 | Roberts et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0062954 A1 | 3/2015 | Crossland et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0236613 A1 | 8/2016 | Trier | |

FOREIGN PATENT DOCUMENTS

| | | |
|---|---|---|
| CN | 201169230 Y | 2/2009 |
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| JP | 2012004090 A | 1/2012 |
| KR | 20060026531 A | 3/2006 |
| WO | 2006047306 A1 | 5/2006 |
| WO | 2013114747 A1 | 8/2013 |
| WO | 2014068440 A1 | 5/2014 |

* cited by examiner

ILLUMINATED VEHICLE GRILLE ASSEMBLY

FIELD OF THE INVENTION

The present invention generally relates to vehicle grille assemblies, and more particularly, to vehicle grille assemblies capable of illumination.

BACKGROUND OF THE INVENTION

Exterior vehicle lighting applications continue to grow in popularity. Accordingly, a vehicle grille assembly is provided herein and is operable to provide functional lighting as well as impart a stylistic element to a vehicle.

SUMMARY OF THE INVENTION

According to one aspect of the present invention, a vehicle grille assembly is provided and includes a light-transmissive grille. At least one light guide is contained within the grille and a light source is configured to supply light to the at least one light guide to illuminate the grille.

According to another aspect of the present invention, a vehicle grille assembly is provided and includes a light-transmissive grille having a photoluminescent portion. A plurality of light guides are contained within the grille and are optically coupled to the photoluminescent portion. A light source is configured to supply light to the plurality of light guides, wherein the photoluminescent portion luminesces in response to light excitation.

According to yet another aspect of the present invention, a vehicle grille assembly is provided and includes a light-transmissive grille having a first and second photoluminescent portion. A plurality of light guides are contained within the grille and are optically coupled to the first and second photoluminescent portions. A light source is configured to supply light to the plurality of light guides, wherein the first and second photoluminescent portions luminesce in response to light excitation.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
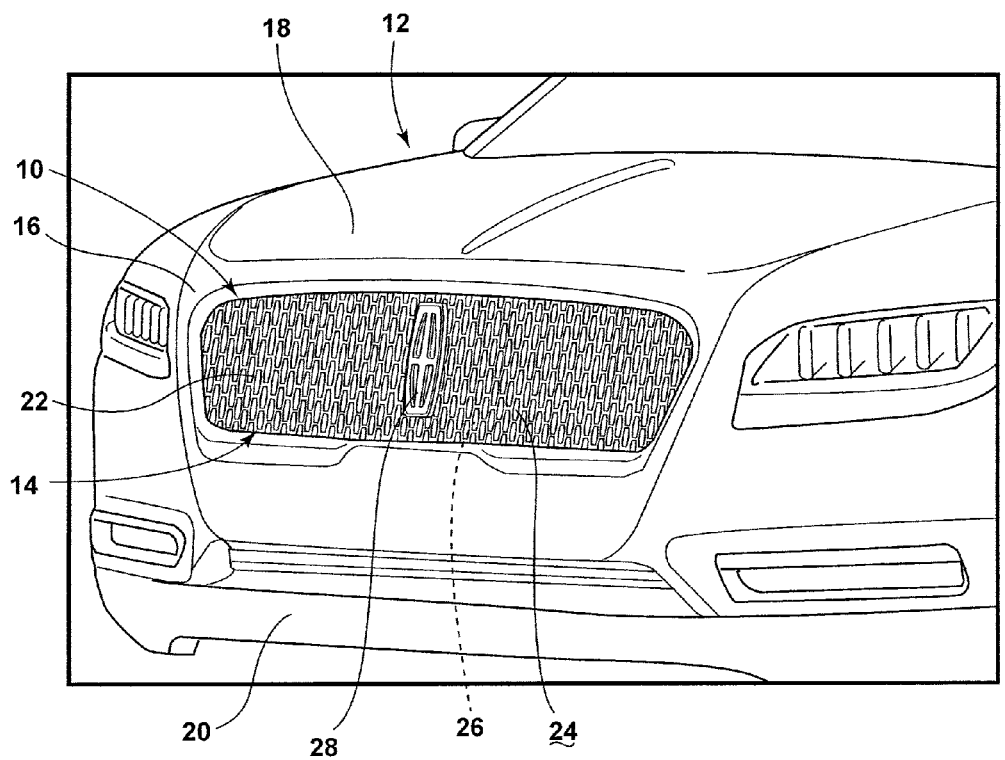
FIG. 1 is a front perspective view of a vehicle having a grilled assembly according to one embodiment.

Referring to FIG. 1, a grille assembly 10 of a vehicle 12 is generally shown according to one embodiment. The grille assembly 10 includes a grille 14 supported to a front body structure 16 of the vehicle 12 in a conventional manner and is generally positioned between a hood 18 and a bumper assembly 20. In the present embodiment, the grille 14 defines a lattice 22 with a number of openings 24 for allowing air to flow into an engine compartment 26 of the vehicle 12. The grille 14 may be planar or arcuate to impart a linear or non-linear contour to the front body structure 16 of the vehicle 12. In the illustrated embodiment, the grille 14 includes an emblem 28 affixed centrally to the front of the grille 14. As will be described herein in greater detail, the grille 14 may have a metallic appearance and is capable of illuminating to provide functional lighting as well as impart a stylistic element to the vehicle 12. According to one embodiment, the front of the grille 14 may illuminate in a first color whereas the back of the grille 14 may illuminate in a second color that may perceptively differ or otherwise be the same as the first color. To an onlooker, light emitted from the back of the grille 14 illuminates the engine compartment 26 and is visible through the openings 24 formed by the lattice 22 of the grille 14.

Figure 2:
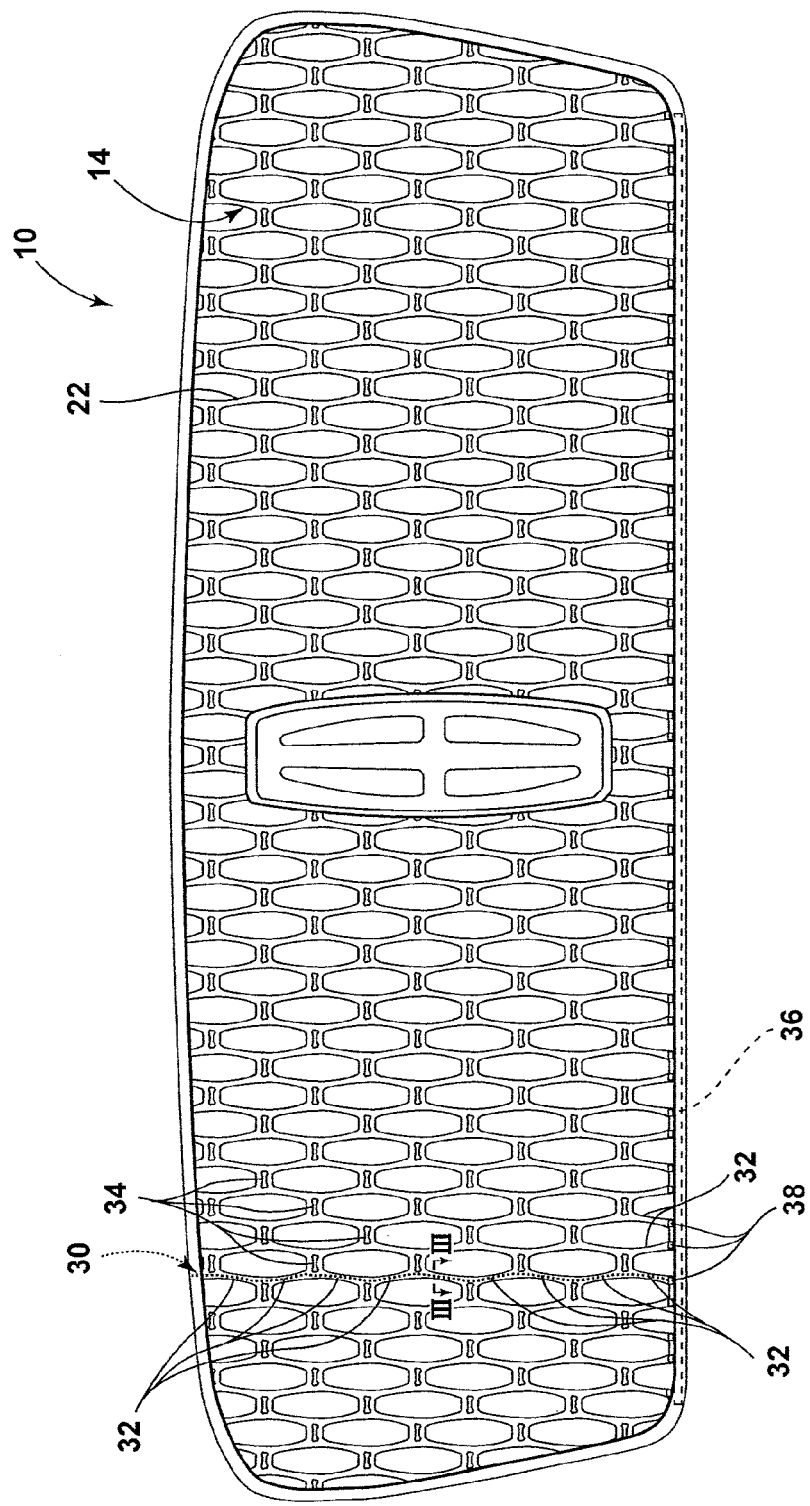
FIG. 2 is front view of the grille assembly shown in FIG. 1.

Referring to FIG. 2, a front view of the grille assembly 10 is shown according to one embodiment. For purposes of illustration and understanding, the grille assembly 10 is shown removed from the vehicle 12. While not shown, it is to be understood that the grille assembly 10 may include a variety of fastening mechanisms for mounting the grille 14 to the vehicle 12. Since such fastening mechanisms are peripheral to the grille assembly 10 and are conventional in nature, further description is omitted for the purpose of brevity.

In the illustrated embodiment, the lattice 22 of the grille 14 is light-transmissive and houses a number of light guides therein that span across a substantial portion or the entirety of the lattice 22. For the sake of clarity, a single light guide 30 is shown in dotted lining to illustrate one manner in which to distribute each light guide in the lattice 22. As shown, the light guide 30 spans upwardly across the lattice 22 via a number of interconnected angled legs 32. According to one embodiment, the light guide 30 is a lone optical fiber or a bundle of optical fibers if size permits. It is to be understood that additional optical fibers may be housed in other portions of the grille 14 following the distribution pattern outlined above. However, it will be apparent to those of ordinary skill in the art that optical fibers may be otherwise distributed within the lattice 22. With the evolution of fiber optics technology, current optical fibers have been shown to exhibit increased flexibility. Accordingly, it is contemplated that optical fibers may be distributed within the lattice 22 to also span across a number of horizontal arms 34 that interconnect with corresponding angled legs. In operation, the optical fiber(s) have light-diffusing properties and are able to distribute light throughout the lattice 22 to evenly illuminate the grille 14. With this in mind, it should be apparent to those of ordinary skill in the art that other grille configurations are also amenable to the inclusion of optical fibers therein. Such grille configurations may include other lattice patterns, grille bars, and the like.

With continued reference to FIG. 2, a printed circuit board (PCB) 36 is disposed proximate a lower peripheral edge of the grille 14. The PCB 36 includes a number of light sources 38 spaced thereon and disposed to emit light in an upward direction. Light emitted from each of the light sources 38 is supplied to the grille 14 via a number of corresponding angled legs 32 located above the light sources 38. Each light source 38 may include a single light-emitting diode (LED) or multiple LEDs that each emit light of a different color. For example, each light source 38 may include a red, green, and blue light-emitting diode that can be operated singly or in combination to produce a variety of colors found in an RGB color model. While the PCB 36 has been shown located proximate the lower peripheral edge of the grille 14, it is contemplated that additional PCBs may be located proximate to other portions of the peripheral edge of the grille 14 in lieu of or in addition to PCB 36 and may also include light sources disposed to supply light to the grille 14 via an angled leg or horizontal arm based on the location of the PCB relative to the grille 14. To account for curvatures in the peripheral edge of the grille 14, it is contemplated that the PCBs may be embodied as flex circuits having the requisite circuitry for driving the light sources. Additionally or alternatively, it is contemplated that a light pipe and/or optical componentry may be used to supply light to the grille 14. In operation, light supplied to the grille 14 from each of the light sources 38 is dispersed by the optical fibers to produce uniform illumination across the grille 14 resulting in both frontward lighting that is visible by an onlooker and rearward lighting that illuminates the engine compartment 26 of the vehicle 12.

Figure 3:
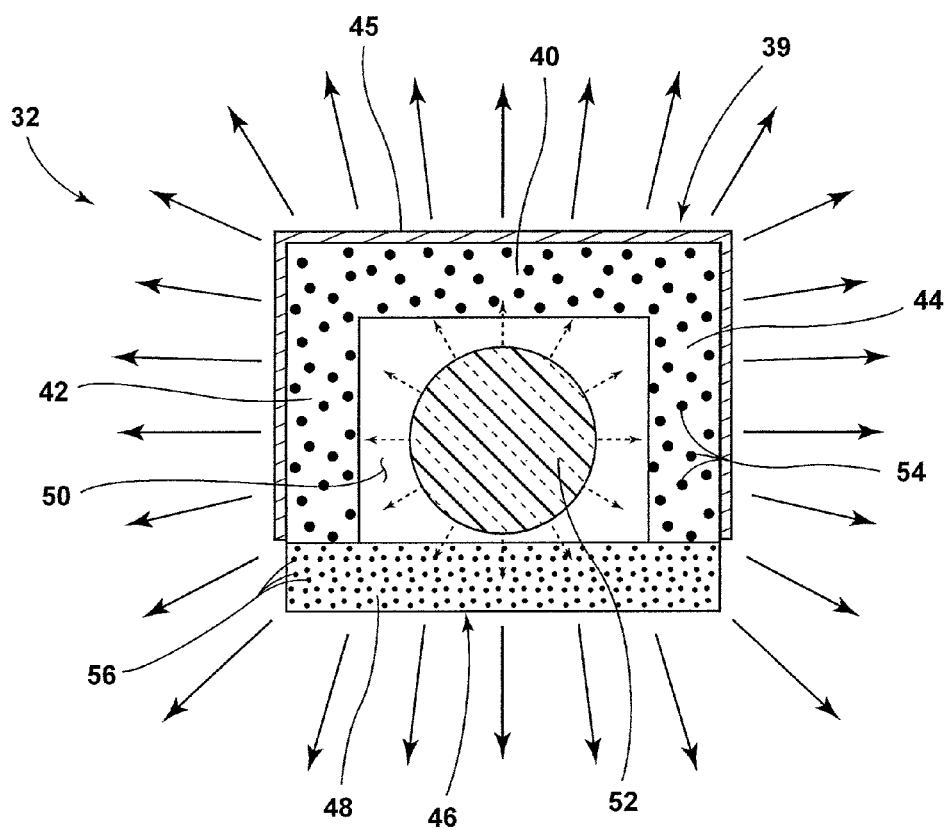
FIG. 3 is a cross-sectional view taken along line III-III of FIG. 2 and illustrates a portion of the a grille according to one embodiment.
Figure 4:
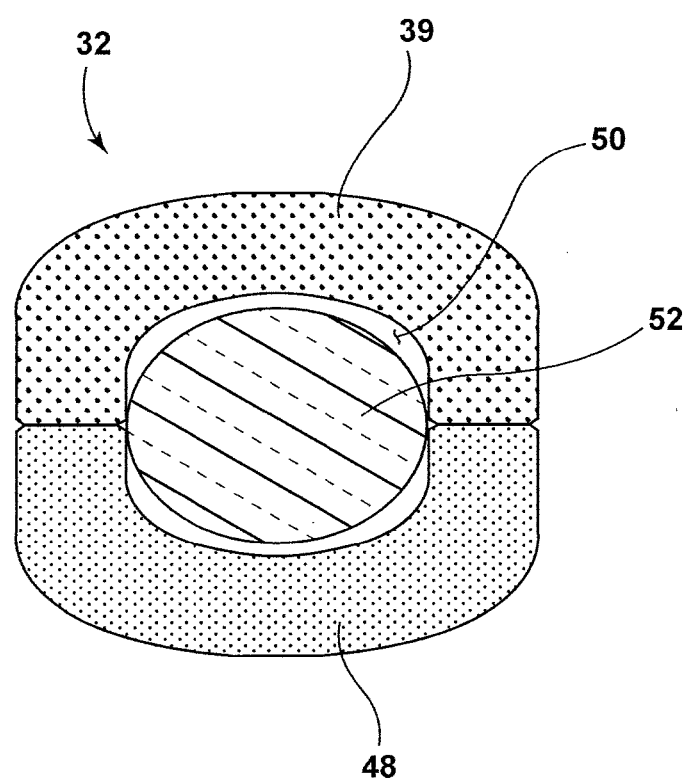
FIG. 4 illustrates an alternative embodiment of the portion of the grille shown in FIG. 3.

Referring to FIG. 3, a cross-section of an angled leg 32 of the grille 14 is shown according to one embodiment. It is to be understood that the horizontal arms 34 of the grille 14 may be similarly configured. As shown angled leg 32 may have a substantially square or rectangular cross-sectional shape and includes a light-transmissive first portion 39 defining a front end 40 and sidewalls 42 and 44 of the angled leg 32. The first portion 39 may be formed by thermoforming a film and insert molding a plastic to the back of the film to impart structural strength and optical capability. In some embodiments, the first portion 39 may include a light-transmissive metallized layer 45 applied to the exterior surfaces of the front end 40 and sidewalls 42, 44 or otherwise coupled thereto to impart a metallic appearance to the angled leg 32, and by extension, to the grille 14, when viewed head on. The angled leg 32 also includes a second portion 46 that defines a rear end 48 of the angled leg 32. The second portion 46 may be a plastic that is overmolded to the first portion 39. When assembled, the first and second portions 39, 46 of the angled leg 32 define a channel 50 in which one or more optical fibers 52 are received. The optical fibers 52 are optically coupled to the first and second portions 39, 46 and disperse light theretoward as generally represented by broken arrows. In response, the first and second portions 39, 46 each illuminate as represented by solid arrows. Illumination of the first portion 39 produces forward lighting that is visible by onlookers whereas illumination of the second portion 46 results in rearward lighting that illuminates the engine compartment 26 of the vehicle 12. In an alternative embodiment, as shown in FIG. 4, the angled leg 32 may have a substantially circular cross-sectional shape, wherein the first and second portions 39, 46 are generally U-shaped to define the channel 50 in which the one or more optical fibers 52 are received.

With continued reference to FIG. 3, the first portion may optionally include photoluminescent materials 54 embedded therein during the insert molding process or otherwise coated thereto by painting, screen printing, flexography, spraying, slot coating, dip coating, roller coating, bar coating, and/or any other methods known in the art. For example, the photoluminescent materials 54 may be coated to the exterior surfaces of the front end 40 and sidewalls 42, 44 of the angled leg 32 followed by the metallized layer 45. Additionally or alternatively, the second portion 46 may also optionally include photoluminescent materials 56 embedded therein or otherwise coupled thereto. In operation, the photoluminescent materials 54, 56 luminesce in response to excitation light (i.e., light supplied from the light sources 38 and supplied thereto via optical fibers 52). In one embodiment, the light sources 38 are configured to supply blue or ultraviolet (UV) light to the grille 14 and the photoluminescent materials 54, 56 are configured to down convert the light into a different colored light of the visible spectrum. Said differently, the photoluminsecent materials may have a Stokes shift resulting in the conversion of visible or non-visible light into visible light having an emission spectrum expressed in a desired color, which may vary per lighting application. It is contemplated that the color of light emitted by the photoluminescent materials 54, 56 may be the same or be perceptively different. In one embodiment, front of the grille 14 may luminesce in a first distinct color whereas the back of the grille 14 may luminesce in a second distinct color that is different than the first distinct color. As described herein, luminescent light emitted from the back of the grille 14 illuminates the engine compartment 26 of the vehicle 12 and is visible through the openings 24 of the lattice 22.

With respect to the embodiments described herein, the photoluminescent materials 54, 56 may include persistent phosphors, which are defined herein as being able to store an excitation light and release light gradually (i.e., a perceptive glow) for a period of several minutes or hours once the activation light is no longer present. The decay time may be defined as the time between the end of excitation from the excitation light and the moment when the light intensity of the persistent phosphors drop below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphors, according to one embodiment, may be operable to emit light at or above an intensity of 0.32 mcd/m$^2$ after a period of about 10 minutes. Additionally, the persistent phosphors may be operable to emit light above or at an intensity of 0.32 mcd/m$^2$ after a period greater than about 30 minutes, greater than about 60 minutes, greater than about 2 hours, greater than about 5 hours, greater than about 10 hours or greater than about 24 hours. The periodic absorption of the excitation light from the light sources 38 may provide for a substantially sustained charge of the persistent phosphors to provide for a consistent passive luminescence of the grille 14. For example, the light sources 38 may be pulsed, or otherwise periodically be activated to charge the persistent phosphors, such that the grille 14 provides a constant or changing level of luminescent light.

The persistent phosphors may correspond to alkaline earth aluminates and silicates, for example, doped disilicates, or any other compound that is capable of emitting light for a period of time once an excitation light is no longer present. The persistent phosphors may be doped with one or more ions, which may correspond to rare earth elements, for example, $Eu^{2+}$, $Tb^{3+}$ and $Dy^{3+}$. It will be understood that the compositions provided herein are non-limiting examples. Thus, any phosphor known in the art may be utilized as the photoluminescent materials 54, 56 without departing from the teachings provided herein. Moreover, it is contemplated that any persistent phosphor known in the art may also be utilized without departing from the teachings provided herein.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Additionally or alternatively, the photoluminescent materials 54, 56 may have energy converting elements with phosphorescent or fluorescent properties. For example, the photoluminescent materials 54, 56 may include organic or inorganic fluorescent dyes including rylenes, xanthenes, porphyrins, and phthalocyanines, or combinations thereof. Additionally or alternatively, the photoluminescent materials 54, 56 may include phosphors from the group of Ce-doped garnets such as YAG:Ce. It is to be understood that foregoing compounds may be activated by the same or a different excitation light as the persistent phosphors.

Figure 5:
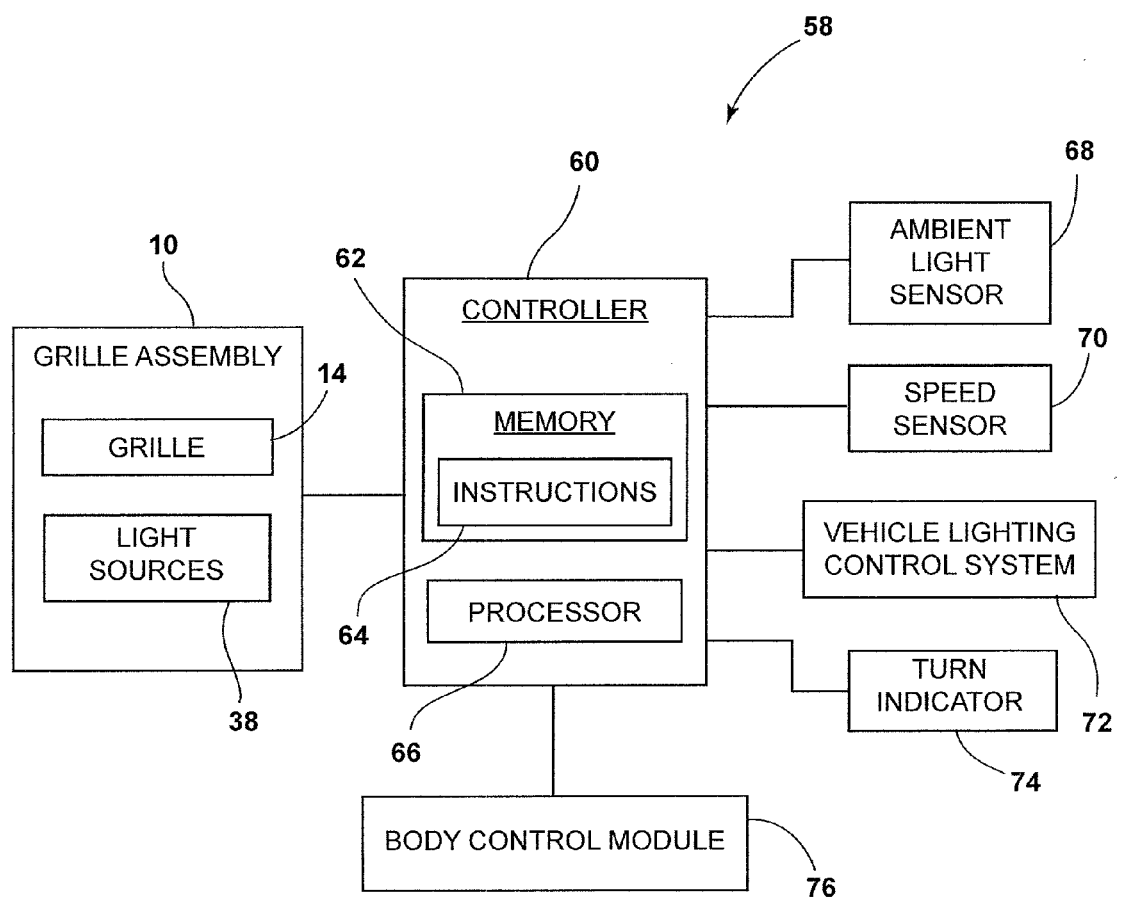
FIG. 5 is a block diagram of a vehicle lighting system according to one embodiment.

Referring to FIG. 5, a block diagram of a vehicle lighting system 58 is shown according to one embodiment and includes the grille assembly 10 according to any of the embodiments described herein. As shown, the light sources 38 of the grille assembly 10 are operably connected to a controller 60, which may be disposed inside the vehicle 12 and may correspond to a standalone controller or otherwise integrated with an existing vehicle system. The controller 60 includes a memory 62 having instructions 64 stored thereon that are executable by a processor 66. The instructions 64 may generally relate to one or more ways in which to operate the light sources 38 to ultimately effect the manner in which the grille 14 illuminates or luminesces. The controller 60 may also communicate with other vehicle devices such as, but not limited to, an ambient light sensor 68, a speed sensor 70, a vehicle lighting control system 72, a turn indicator 74, as well as a body control module 76 of the vehicle 12. By leveraging these vehicle devices, the grille 14 may provide a variety of functional lighting. For example, the grille 14 may illuminate as a supplemental daytime running lamp, a hazard light, or a turn signal. Additionally, the grille 14 may be illuminated during a welcome or departure event when a user unlocks or locks the vehicle 12. While a few specific examples have been provided herein, it will be apparent to those of ordinary skill in the art that the grille 14 may be illuminated to provide other types of functional lighting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle grille assembly comprising:
    a light-transmissive grille of the vehicle having a photoluminescent portion;
    at least one light guide contained within the grille; and
    a light source configured to supply light to the at least one light guide to illuminate the grille by the photoluminescent portion.

2. The vehicle grille assembly of claim 1, wherein the grille is configured as a lattice.

3. The vehicle grille assembly of claim 1, wherein the at least one light guide comprises one or more optical fibers.

4. The vehicle grille assembly of claim 1, wherein the light source is provided on a printed circuit board that is disposed proximate a peripheral edge of the grille.

5. The vehicle grille assembly of claim 4, wherein the light source comprises a plurality of light-emitting diodes each configured to supply light to a corresponding light guide.

6. The vehicle grille assembly of claim 1, wherein at least a front portion of the grille is metallized to impart a metallic appearance thereto.

7. The vehicle grille assembly of claim 1, wherein the at least one light guide illuminates a front and rear portion of the grille such that illumination of the front portion of the grille is visible to an onlooker and illumination of the rear portion provides lighting to an engine compartment that is visible through a number of openings in the grille.

8. A vehicle grille assembly comprising:
    a light-transmissive grille of the vehicle having a photoluminescent portion;
    a plurality of light guides contained within the grille and optically coupled to the photoluminescent portion; and
    a light source configured to supply light to the plurality of light guides, wherein the photoluminescent portion luminesces in response to light excitation.

9. The vehicle grille assembly of claim 8, wherein the grille is configured as a lattice.

10. The vehicle grille assembly of claim 8, wherein the plurality of light guides each comprise at least one optical fiber.

11. The vehicle grille assembly of claim 8, wherein the light source is provided on a printed circuit board that is disposed proximate a peripheral edge of the grille.

12. The vehicle grille assembly of claim 11, wherein the light source comprises a plurality of light-emitting diodes each configured to supply light to a corresponding light guide.

13. The vehicle grille assembly of claim 8, wherein at least a front portion of the grille is metallized to impart a metallic appearance thereto.

14. The vehicle grille assembly of claim 8, wherein the photoluminescent portion defines one of a front and a rear portion of the grille.

15. A vehicle grille assembly comprising:
    a light-transmissive grille of the vehicle having a first and second photoluminescent portion;

a plurality of light guides contained within the grille and optically coupled to the first and second photoluminescent portions; and a light source configured to supply light to the plurality of light guides, wherein the first and second photoluminescent portions luminesce in response to light excitation.

16. The vehicle grille assembly of claim 15, wherein the grille is configured as a lattice.

17. The vehicle grille assembly of claim 15, wherein the plurality of light guides each comprise at least one optical fiber.

18. The vehicle grille assembly of claim 15, wherein the light source is provided on a printed circuit board that is disposed proximate a peripheral edge of the grille, and wherein the light source comprises a plurality of light-emitting diodes each configured to supply light to a corresponding light guide.

19. The vehicle grille assembly of claim 15, wherein at least a front portion of the grille is metallized to impart a metallic appearance thereto.

20. The vehicle grille assembly of claim 15, wherein one of the first and second photoluminescent portions defines a front portion of the grille and the other of the first and second photoluminescent portions defines a rear portion of the grille, and wherein the front portion of the grille luminesces in a first color that is visible to an onlooker and the rear portion luminesces in a second color to provide lighting to an engine compartment that is visible through a number of openings in the grille.

* * * * *